US011059563B2

(12) United States Patent
Gruner et al.

(10) Patent No.: US 11,059,563 B2
(45) Date of Patent: Jul. 13, 2021

(54) COLLAPSIBLE FLAP DEPLOYMENT SYSTEM FOR A WING OF AN AIRCRAFT

(71) Applicant: The Boeing Company, Chicago, IL (US)

(72) Inventors: Bryan Jacob Gruner, Bellevue, WA (US); Kevin R. Tsai, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 345 days.

(21) Appl. No.: 16/123,781

(22) Filed: Sep. 6, 2018

(65) Prior Publication Data

US 2020/0079491 A1    Mar. 12, 2020

(51) Int. Cl.
| | |
|---|---|
| *B64C 3/56* | (2006.01) |
| *B64C 3/50* | (2006.01) |
| *B64C 3/48* | (2006.01) |
| *B64C 3/28* | (2006.01) |
| *B64C 9/02* | (2006.01) |
| *B64C 1/06* | (2006.01) |

(52) U.S. Cl.
CPC .............. *B64C 3/56* (2013.01); *B64C 1/062* (2013.01); *B64C 3/28* (2013.01); *B64C 3/48* (2013.01); *B64C 3/50* (2013.01); *B64C 9/02* (2013.01)

(58) Field of Classification Search
CPC .... B64C 3/56; B64C 3/28; B64C 3/48; B64C 3/50; B64C 9/02; B64C 1/062; B64C 3/18; B64C 3/20
See application file for complete search history.

(56) References Cited

U.S. PATENT DOCUMENTS

| | | | |
|---|---|---|---|
| 2007/0102589 A1 | 5/2007 | Holert | |
| 2009/0217487 A1* | 9/2009 | Sharp | B64C 9/02 16/387 |
| 2009/0218450 A1* | 9/2009 | McAlinden | B64C 9/02 244/90 R |

(Continued)

FOREIGN PATENT DOCUMENTS

| | | | | |
|---|---|---|---|---|
| DE | 102017117314 A1 * | 1/2019 | | B64C 9/02 |

OTHER PUBLICATIONS

New R&D Programme for Flap Supports; SL SABCA Limburg N.V. 2018.
U.S. Patent and Trademark Office; Office Action for U.S. Appl. No. 16/018,517, dated Jun. 30, 2020.

*Primary Examiner* — Richard R. Green
*Assistant Examiner* — William L Gmoser
(74) *Attorney, Agent, or Firm* — Parsons Behle & Latimer (57) ABSTRACT

A collapsible flap deployment system for an aircraft wing that includes a support beam pivotably connected to a carrier beam, which is connected to a wing flap. A rear spar fitting is connected to a wing rear spar by a first plurality of fasteners and a second plurality of fasteners connects the support beam to the rear spar fitting. A fuse pin connects a link to the rear spar fitting. The fuse pin is configured to shear upon the application of a first predetermined force. An impact load to the bottom of the support beam puts the link into compression applying a force to the fuse pin until the fuse pin shears releasing the link from the rear spar fitting. The impact load rotates the support beam and carrier beam causing the second plurality of fasteners to fail releasing the support beam and carrier beam from the wing rear spar.

20 Claims, 7 Drawing Sheets

(56) References Cited

U.S. PATENT DOCUMENTS

| | | | |
|---|---|---|---|
| 2011/0042525 A1* | 2/2011 | Parker | B64C 9/16 244/213 |
| 2013/0087662 A1* | 4/2013 | Soenarjo | B64C 3/50 244/215 |
| 2013/0099061 A1* | 4/2013 | Grieco | B64C 9/02 244/213 |
| 2014/0175216 A1* | 6/2014 | Ishihara | B64C 9/02 244/99.3 |
| 2015/0292561 A1 | 10/2015 | Mcneil et al. | |
| 2016/0009366 A1* | 1/2016 | Marks | B29C 53/04 244/123.1 |
| 2016/0068255 A1 | 3/2016 | Soenarjo | |
| 2017/0137147 A1* | 5/2017 | Christman | B64C 1/062 |
| 2017/0158310 A1 | 6/2017 | Osborn et al. | |
| 2019/0112027 A1 | 4/2019 | Ahern et al. | |
| 2019/0161165 A1 | 5/2019 | Milligan et al. | |

\* cited by examiner

COLLAPSIBLE FLAP DEPLOYMENT SYSTEM FOR A WING OF AN AIRCRAFT

FIELD OF THE DISCLOSURE

The examples described herein relate to a flap deployment apparatus, flap deployment systems, and methods of providing flap deployment systems for a wing on an aircraft that are collapsible upon an impact load being applied to a bottom portion of the flap deployment apparatus.

BACKGROUND

Description of the Related Art

The wings of aircraft typically include flaps, which are usually secondary control surfaces on the trailing edge of the wing. Flap deployment systems may be used to deploy the flaps aft and down from the trailing edge of the wing. Flaps may be lowered to increase the camber of the wing and provide greater lift and/or control at slower flying speeds. Typically, flaps may be extended up to approximately 55 degrees. Flaps are typically connected to the wing by a support beam. Flaps are generally moveable from a stowed position to a deployed positioned by various actuators moving a carrier beam that is hinged to the support beam. An aerodynamic fairing is typically used to cover these structural components, i.e. the support beam and carrier beam, to decrease the drag.

Flap deployment systems are typically connected to the wing rear spar of an aircraft, which may include a fuel tank within the wing rear spar. Fasteners typically connect the flap deployment system to the wing rear spar. The fasteners connecting the flap deployment system may extend into a portion of the fuel tank. Upon an impact load being applied to a bottom portion of the flap deployment system, the failure of the fasteners may provide a leak in the fuel tank, which is undesirable. It is desirable to have the fuel tank remain intact upon the application of an impact load being applied to the bottom portion of the flap deployment system.

Other disadvantages of current flap deployment systems may exist.

SUMMARY

The present disclosure is directed to a flap deployment system for a wing of an aircraft that is collapsible upon the application of an impact load being applied to the bottom portion of the flap deployment system. The flap deployment system is configured to collapse and move away from the rear wing spar.

One example of the present disclosure is a collapsible flap deployment system for a wing of an aircraft comprising a first support beam having a first end and a second end. The collapsible flap deployment system includes a carrier beam pivotably connected to the second end of the first support beam, the carrier beam being configured to connect to a flap. The collapsible flap deployment system includes a first rear spar fitting connected to a wing rear spar by a first plurality of fasteners. A second plurality of fasteners connects the first end of the first support beam to the first rear spar fitting. The collapsible flap deployment system includes a first link connected between a portion of the first support beam and the first rear spar fitting and a first fuse pin that connects the first link to the first rear spar fitting. The first fuse pin is configured to shear upon the application of a first predetermined force.

The collapsible flap deployment system may include a fuel tank positioned within the wing rear spar. The second plurality of fasteners may be configured to fail upon the application of a second predetermined bending force. The second plurality of fasteners may each be positioned outside of the fuel tank. Upon an impact load being applied to a bottom of the first support beam, the first link may be configured to be put in compression until the first fuse pin shears upon application of the first predetermined force to release the first link from the first rear spar fitting. The first support beam and the carrier beam may be configured to rotate away from the second plurality of fasteners upon shearing of the first fuse pin. The rotation of the first support beam and the carrier beam may apply a bending force to the second plurality of fasteners until the application of the second predetermined bending force causes the second plurality of fasteners to fail and release the first end of the first support beam from the first rear spar fitting. The second plurality of fasteners may be configured to fail prior to the failure of the first plurality of fasteners.

The first support beam may include a first sidewall, a second sidewall, a plurality of cross members that extend between the first sidewall and the second sidewall, and a plurality of pockets between the plurality of cross members of the first and second sidewalls. The collapsible flap deployment system may include a drive link pivotably connected between the first rear spar fitting and the carrier beam, wherein movement of the drive link moves the flap between a stowed position and a deployed position. The collapsible flap deployment system may include a fairing that encloses at least a portion of the first support beam.

The collapsible flap deployment system may include a second support beam having a first end and a second end, wherein the carrier beam is pivotably connected to the second end of the second support beam. The collapsible flap deployment system may include a second rear spar fitting connected to the wing rear spar by a third plurality of fasteners and a fourth plurality of fasteners that connects the first end of the second support beam to the second rear spar fitting. The collapsible flap deployment system may include a second link connected between a portion of the second support beam and the second rear spar fitting and a second fuse pin that connects the second link to the second rear spar fitting. The second fuse pin may be configured to shear upon the application of the first predetermined force. Upon an impact load being applied to a bottom of the second support beam, the second link may be configured to be put in compression until the second fuse pin shears upon application of the first predetermined force to release the second link from the second rear spar fitting. Each of the fourth plurality of fasteners may be positioned outside of the fuel tank. Each of the fourth plurality of fasteners may be configured prior to a failure of the third plurality of fasteners.

One example of the present disclosure is a collapsible flap deployment apparatus comprising a first support beam having a first end and a second end. The collapsible flap deployment apparatus includes a carrier beam pivotably connected to the second end of the first support beam. The carrier beam is configured to be connected to a flap of an aircraft. The collapsible flap deployment apparatus includes a first rear spar fitting connected to a wing rear spar by a first plurality of fasteners and a second plurality of fasteners that connects the first end of the first support beam to the first rear spar fitting.

The collapsible flap deployment apparatus includes a first link connected between a portion of the first support beam and the first rear spar fitting and a first fuse pin that connects the first link to the first rear spar fitting. The first fuse pin is configured to shear upon the application of a first predetermined force. The collapsible flap deployment apparatus includes a second support beam having a first end and a second end, wherein the carrier beam is pivotably connected to the second end of the second support beam. The collapsible flap deployment apparatus includes a second rear spar fitting connected to the wing rear spar by a third plurality of fasteners and a fourth plurality of fasteners that connects the first end of the second support beam to the second rear spar fitting. The collapsible flap deployment apparatus includes a second link connected between a portion of the second support beam and the second rear spar fitting and a second fuse pin that connects the second link to the second rear spar fitting. The second fuse pin is configured to shear upon the application of the first predetermined force.

The first link, the second link, the first plurality of fasteners, the second plurality of fasteners, the third plurality of fasteners, and the fourth plurality of fasteners of the collapsible flap deployment apparatus may be configured to first release the second ends of the first and second support beams from the first and second rear spar fittings, respectively, upon the impact load being applied to a bottom of the first and second support beams by the shearing of the first and second fuse pins. The first link, the second link, the first plurality of fasteners, the second plurality of fasteners, the third plurality of fasteners, and the fourth plurality of fasteners of the collapsible flap deployment apparatus may be configured to release the first ends of the first and second support beams from the first and second rear spar fittings, respectively, upon the impact load being applied to the bottom of the first and second support beams by causing the second and fourth plurality of fasteners to fail and release the first support beam, the second support beam, and the carrier beam from the first and second rear spar fittings.

One example of the present disclosure is a method of providing a collapsible flap deployment apparatus comprising coupling a second end of a first support beam to a carrier beam, the carrier beam being configured to be connected to a flap of an aircraft. The method includes coupling a first end of the first support beam to a first rear spar fitting with a first plurality of fasteners, the first rear spar fitting being connected to a wing rear spar. The method includes coupling a first link between a portion of the first support beam and the first rear spar fitting with a first fuse pin, wherein upon an impact load the first link is configured to be in compression and apply a force to the first fuse pin until a predetermined force shears the first fuse pin. The shearing of the first fuse pin uncouples the portion of the first support beam from the first rear spar fitting. Each of the first plurality of fasteners are configured to fail after the shearing of the first fuse pin to release the first support beam and the carrier beam from the first rear spar fitting.

The method may comprise coupling a second end of a second support beam to the carrier beam. The method may include coupling a first end of the second support beam to a second rear spar fitting with a second plurality of fasteners, the second rear spar fitting being connected to the wing rear spar. The method may include coupling a second link between a portion of the second support beam and the second rear spar fitting with a second fuse pin, wherein upon the impact load the second link is configured to be in compression and apply a force to the second fuse pin until a predetermined force shears the second fuse pin. The shearing of the second fuse pin uncouples the portion of the second support beam from the second rear spar fitting. Each of the second plurality of fasteners are configured to fail after the shearing of the second fuse pin to release the second support beam and the carrier beam from the second rear spar fitting.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
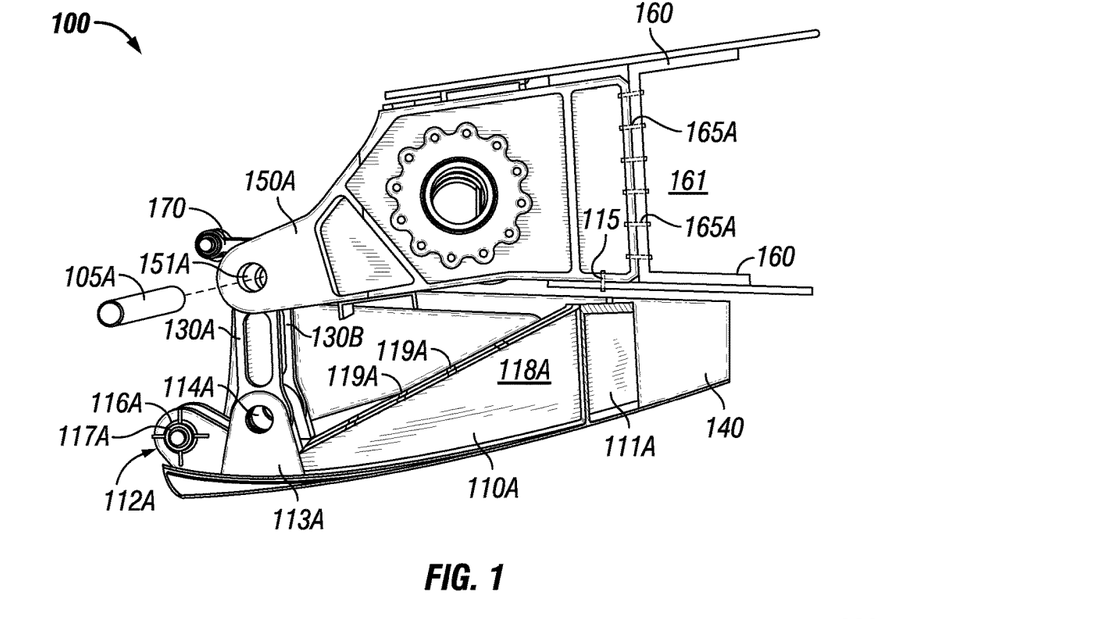
FIG. 1 is a schematic of a portion of one example of a collapsible flap deployment apparatus for a wing of an aircraft.

FIG. 1 shows a schematic of a portion of one example of a collapsible flap deployment apparatus 100. The collapsible flap deployment apparatus 100 includes a first support beam 110A having a first end 111A and a second end 112A. A portion 113A of the first support beam 110A is connected to a first link 130A that extends between the first support beam 110A and a first rear spar fitting 150A. The first rear spar fitting 150A is connected to a wing rear spar 160 of an aircraft via a first plurality of fasteners 165A. The wing rear spar 160 may include a fuel tank 161 within the interior of the wing rear spar 160 as would be appreciated by one of ordinary skill in the art. The first plurality of fasteners 165A may extend into a portion of the fuel tank 161.

The first end 111A of the first support beam 110A is connected to the first rear spar fitting 150A via a second plurality of fasteners 115. FIG. 1 shows a single fastener 115 for clarity, but other fasteners 115 may be positioned behind the single fastener 115 shown as would be appreciated by one of ordinary skill in the art having the benefit of this disclosure. The second plurality of fasteners 115 are each positioned outside of the fuel tank 161. The first support beam 110A includes an aperture 116A at the second end 112A. A fastener 117A may be used to connect a portion of a carrier beam 120 (shown in FIG. 2) to the second end 112A of the first support beam 110A. Likewise, a fastener 117B may be used to connect a portion of the carrier beam 120 to the second end 112B of the second support beam 110B.

The support beam 110A includes a first sidewall 118A, a second sidewall 122A (shown in FIG. 6), a plurality of cross members 119A extending between the first and second side walls 118A, 122A, and a plurality of pockets 121A (shown in FIG. 6) that are formed between the cross members 119A and the sidewalls 118A, 122A. The support beam 110A may be formed with cross members 119A and pockets 121A to decrease the weight of the support beam 110A while providing adequate structural strength. The shape, size, and/or configuration of the first support beam 110A may be varied depending on the application as would be appreciated by one of ordinary skill in the art having the benefit of this disclosure.

The first support beam 110A includes an aperture 114A in a portion 113A of the first support beam 110A that enables a fastener (not shown) to connect the first support beam 110A to the first link 130A. A fuse pin 105A connects the first link 130A to the first rear spar fitting 150A. The fuse pin 105A is inserted into an aperture 151A of the first rear spar fitting 150A to connect the first link 130A as would be appreciated by one of ordinary skill in the art having the benefit of this disclosure. The collapsible flap deployment apparatus 100 includes a drive link 170 that is connected to the carrier beam 120 (shown in FIG. 2) and may be used to actuate the flap between a stowed position and a deployed positioned as discussed herein. The collapsible flap deployment apparatus 100 may include an aerodynamic fairing 140, a portion of which is shown in FIG. 1, positioned to enclose at least a portion of the first support beam 110A. The fairing 140 may be used to cover non-aerodynamic components of the collapsible flap deployment apparatus 100 as would be appreciated by one of ordinary skill in the art.

In the event that there is an impact load to a bottom portion of the collapsible flap deployment apparatus 100, the first fuse pin 105A is configured to shear upon the application of a first predetermined force to the first fuse pin 105A. The first predetermined force may be varied depending on the application as would be appreciated by one of ordinary skill in the art. The shearing of the first fuse pin 105A releases the portion 113A of the first support beam 110A from the first rear spar fitting 150A. The impact load will then rotate the first support beam 110A and attached carrier beam 120 away from the wing rear spar 160 applying a bending force on the second plurality of fasteners 115 connecting the first end 111A of the first support beam 110A to the first rear spar fitting 150A. Once the bending force reaches a second predetermined force, the second plurality of fasteners 115 will fail releasing the first support beam 110A, carrier beam 120, and the flap 190, which is attached to the carrier beam 120, from the wing rear spar 160 increasing the probability that the fuel tank 161 within the wing rear spar 160 will remain intact. The first fuse pin 105A and second plurality of fasteners 115 are configured to enable the first fuse pin 105A to first shear permitting the rotation of the components to apply the bending force onto the second plurality of fasteners 115, which fail after the shearing of the first fuse pin 105A.

The collapsible flap deployment apparatus 100 may include redundant components to enable operation of the flap deployment apparatus even in the event of premature failure of a component of the apparatus. For example, the collapsible flap deployment apparatus 100 may include a second support beam 110B (shown in FIG. 3) having a first end 111B (shown in FIG. 2) and a second end 112B and a third support beam 110C (shown in FIG. 3) also having a first end and a second end 112C. A portion 113C of the third support beam 110C is connected to a second link 130B that extends between the third support beam 110C and a second rear spar fitting 150B. The second rear spar fitting 150B is connected to the wing rear spar 160 of an aircraft via a third plurality of fasteners 165B. The third plurality of fasteners 165B may extend into a portion of the fuel tank 161 within the wing rear spar 160.

The first end 111B of the second support beam 110B is connected to the second rear spar fitting 150B via a fourth plurality of fasteners 115, which are in-line with the fastener shown in FIG. 1. The fourth plurality of fasteners 115 are positioned outside of the fuel tank 161. The second support beam 110B includes an aperture 116B at the second end 112B. Likewise, the third support beam 110C includes an aperture 116C at the second end 112C. A fastener may be used to connect a portion of the carrier beam 120 (shown in FIG. 2) to the second end 112B of the second support beam 110B and the second end 112C of the third support beam 110C. The support beam 110B includes a first sidewall 118B, a second sidewall 122B (shown in FIG. 6), a plurality of cross members 119B extending between the first and second side walls 118B, 122B, and a plurality of pockets 121B (shown in FIG. 6) that are formed between the cross members 119B and the sidewalls 118B, 122B. The second support beam 110B may be formed with cross members 119B and pockets 121B to decrease the weight of the second support beam 110B while providing adequate structural strength. The shape, size, and/or configuration of the second support beam 110B may be varied depending on the application as would be appreciated by one of ordinary skill in the art having the benefit of this disclosure. The third support beam 110C may not include the cross members and pockets as shown in FIG. 3. The number, size, shape, and/or location of the support beams 110A, 110B, and 110C may be varied depending on the application as would be appreciated by one of ordinary skill in the art having the benefit of this disclosure.

The third support beam 110C includes an aperture 114C in a portion 113C of the third support beam 110C that enables a fastener (not shown) to connect the third support beam 110C to the second link 130B. The second support beam 110B is connected to the third support beam 110C and, thus, is connected to the second link 130B via the third support beam 110C. A fuse pin 105B connects the second link 130B to the second rear spar fitting 150B. The fuse pin 105B is inserted into an aperture of the second rear spar fitting 150B to connect the second link 130B as would be appreciated by one of ordinary skill in the art having the benefit of this disclosure.

In the event that there is an impact load to a bottom portion of the collapsible flap deployment apparatus 100, the second fuse pin 105B is configured to shear upon the application of a first predetermined force to the second fuse pin 105B. The first predetermined force may be varied depending on the application as would be appreciated by one of ordinary skill in the art. The shearing of the second fuse pin 105B releases the portion 113C of the third support beam 110C from the second rear spar fitting 150B. The impact load will then rotate the second and third support beams 110B, 110C and attached carrier beam 120 away from the wing rear spar 160 applying a bending force on the fourth plurality of fasteners 115 connecting the first end 111B of the second support beam 110B to the second rear spar fitting 150B. Once the bending force reaches a second predetermined force, the fourth plurality of fasteners 115 will fail releasing the second support beam 110B, the third support beam 110C, carrier beam 120, and the flap 190, which is attached to the carrier beam 120, from the wing rear spar 160 increasing the probability that the fuel tank 161 within the wing rear spar 160 will remain intact. The second fuse pin 105B and fourth plurality of fasteners 115 are configured to enable the second fuse pin 105B to first shear permitting the rotation of the components to apply the bending force onto the fourth plurality of fasteners 115, which fail after the shearing of the second fuse pin 105B. The second and fourth plurality of fasteners 115 that connect the first and second support beam 110A, 110B to the first and second rear spar fittings 150A, 150B may be configured in a straight line to ensure that the bending force, arrows 30A and 30B (shown in FIG. 8), cause the failure of the second and fourth plurality of fasteners 115.

Figure 2:
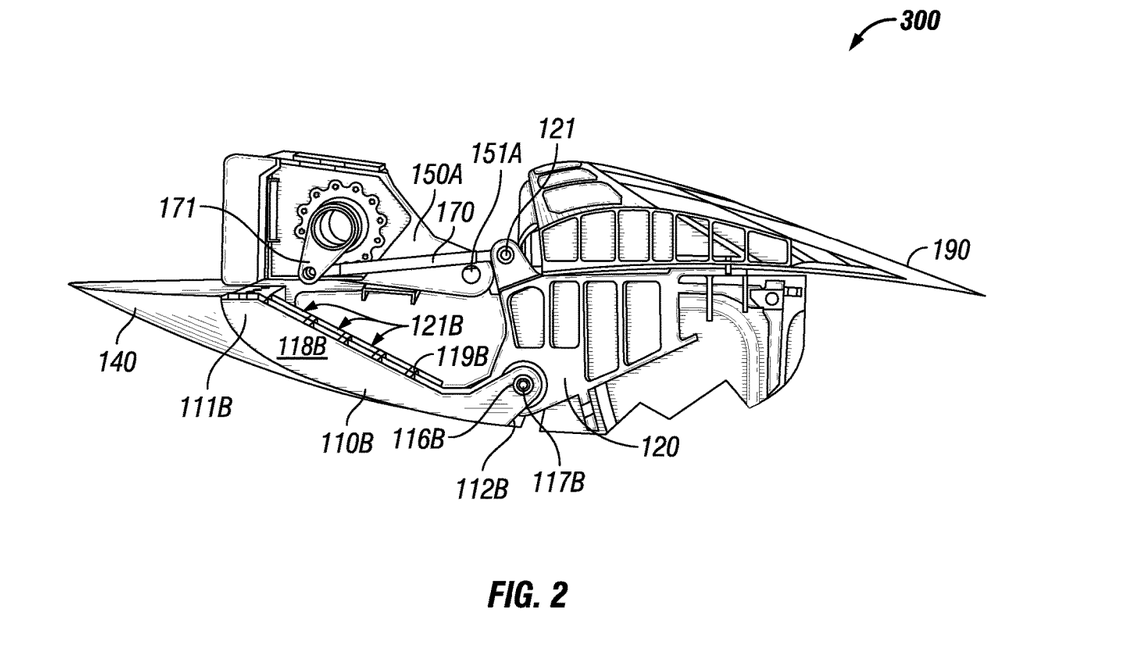
FIG. 2 is a schematic of one example of a collapsible flap deployment system for a wing of an aircraft.
Figure 3:
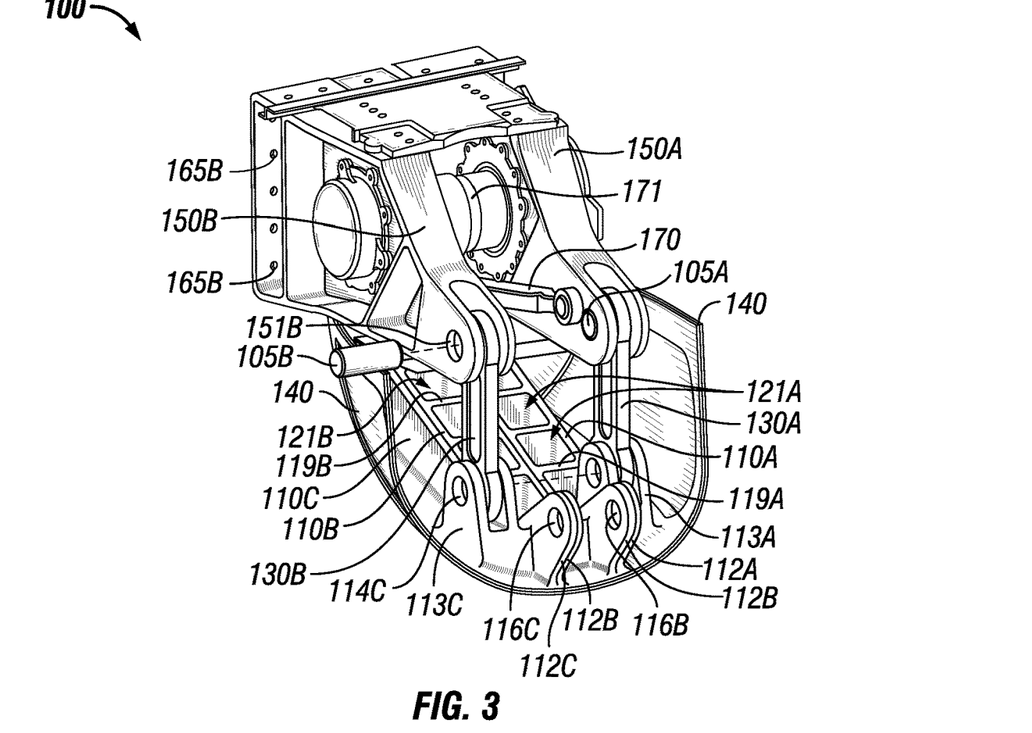
FIG. 3 is an isometric schematic of a portion of one example of a collapsible flap deployment apparatus for a wing of an aircraft.

FIG. 2 is a schematic of one example of a collapsible flap deployment system 300 for a wing of an aircraft. The second rear spar fitting 150B is not included in FIG. 2 for clarity purposes. A flap 190 is connected to the carrier beam 120. The carrier beam 120 is connected to the second end 112B of the second support beam 110B. The carrier beam 120 is also connected to the second end 112A of the first support beam 110 although not shown in FIG. 2. The drive link 170 is connected to a portion 121 of the carrier beam 120. The drive link 170 may be moved via an actuator 171 causing the movement of the flap 190 as would be appreciated by one of ordinary skill in the art having the benefit of this disclosure. The support beams 110A, 110B, the carrier beam 120, the rear spar fittings 150A, 150B, the fasteners 115, 165A, the links 130A, 130B, the fuse pins 105, 105B, the wing rear spar 160, the fuel tank 161, and the flap 190 are shown for illustrative purposes and the size, shape, number, and/or configuration of each may be varied depending on the application as would be appreciated by one of ordinary skill in the art having the benefit of this disclosure.

Figure 4:
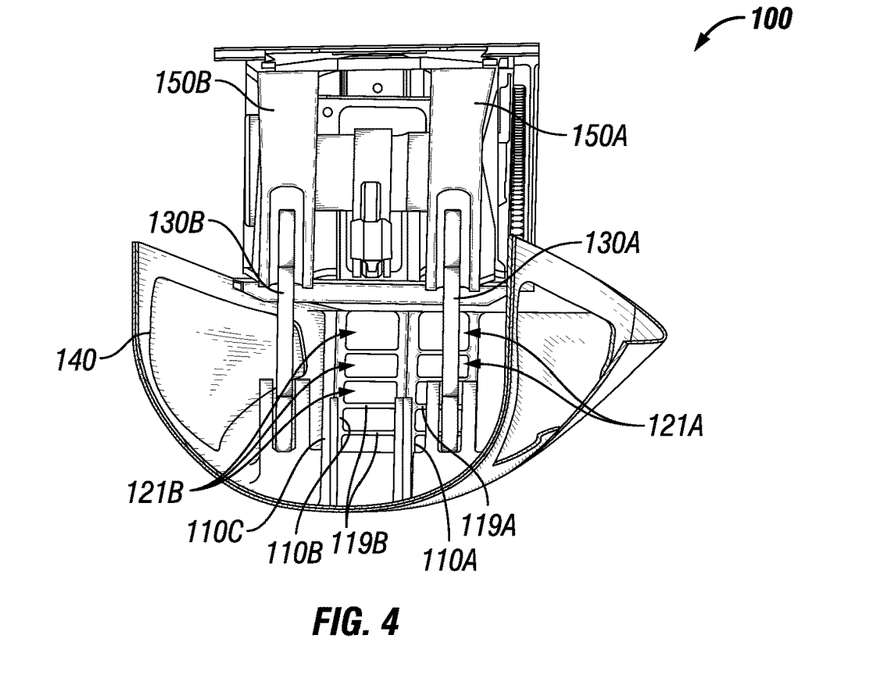
FIG. 4 is a top view schematic of a portion of one example of a collapsible flap deployment apparatus for a wing of an aircraft.

FIG. 3 is an isometric schematic and FIG. 4 is a top view schematic of a portion of one example of a collapsible flap deployment apparatus 100 for a wing of an aircraft. As discussed herein, the collapsible flap deployment apparatus 100 may include a first support beam 110A, a second support beam 110B, and a third support beam 110C. A first link 130A connects a portion 113A of the first support beam 110A to the first rear spar fitting 150A and a second link 130B connects a portion 113C of the third support beam 110C to the second rear spar fitting 150B. A first fuse pin 105A connects the first link 130A to the first rear spar fitting 150A and a second fuse pin 105B connects the second link 130B to the second rear spar fitting 150B. FIG. 3 shows the second fuse pin 105B positioned adjacent to the aperture 151B of the second rear spar fitting 150B for clarity purposes.

Fasteners may be inserted into apertures 114A and 114C to selectively connect the first and second links 130A, 130B to portions 113A, 113C of the first and third support beams 110A, 110C, respectively, as would be appreciated by one of ordinary skill in the art having the benefit of this disclosure. Fasteners may be inserted into apertures 116A, 116B, 116C located at the second end 112A, 112B, 112C of the first, second, and third support beams 110A, 110B, 110C, respectively, to selectively connect the first, second, and third support beams 110A, 110B, 110C to the carrier beam 120 (shown in FIG. 2) as would be appreciated by one of ordinary skill in the art having the benefit of this disclosure.

Figure 5:
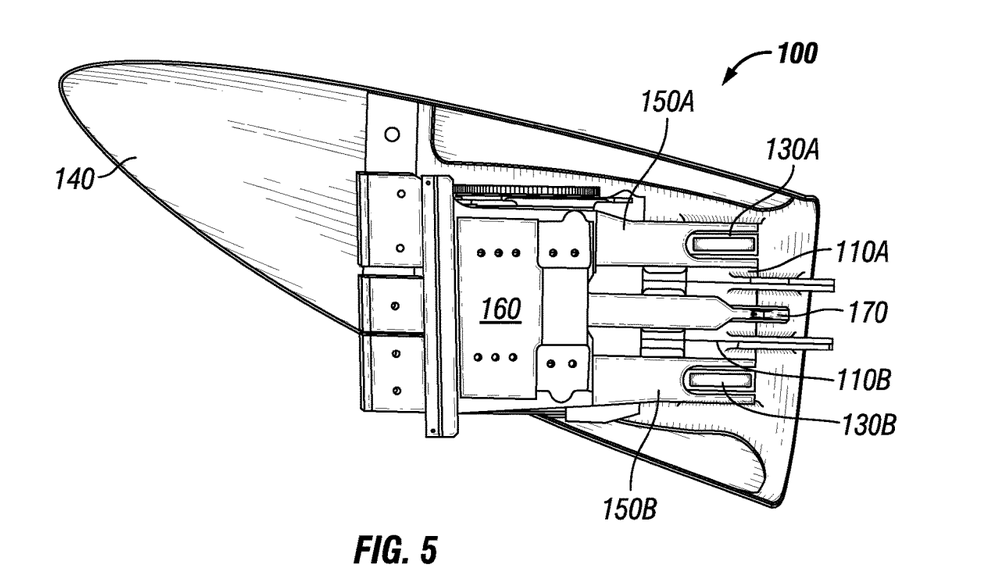
FIG. 5 is a top view schematic of a portion of one example of a collapsible flap deployment system for a wing of an aircraft.

FIG. 5 is a top view schematic of a portion of one example of a collapsible flap deployment apparatus 100 for a wing of an aircraft. First and second rear spar fittings 150A, 150B are each connected to the wing rear spar 160 of an aircraft. Links 130A, 130B connect the first and second support beams 110A, 110B to the first and second rear spar fittings 150A, 150B, respectively. An aerodynamic fairing 140 encloses a portion of the structural elements, such as the first and second support beams 110A, 110B, to improve the aerodynamics of the collapsible flap deployment apparatus 100.

Figure 6:
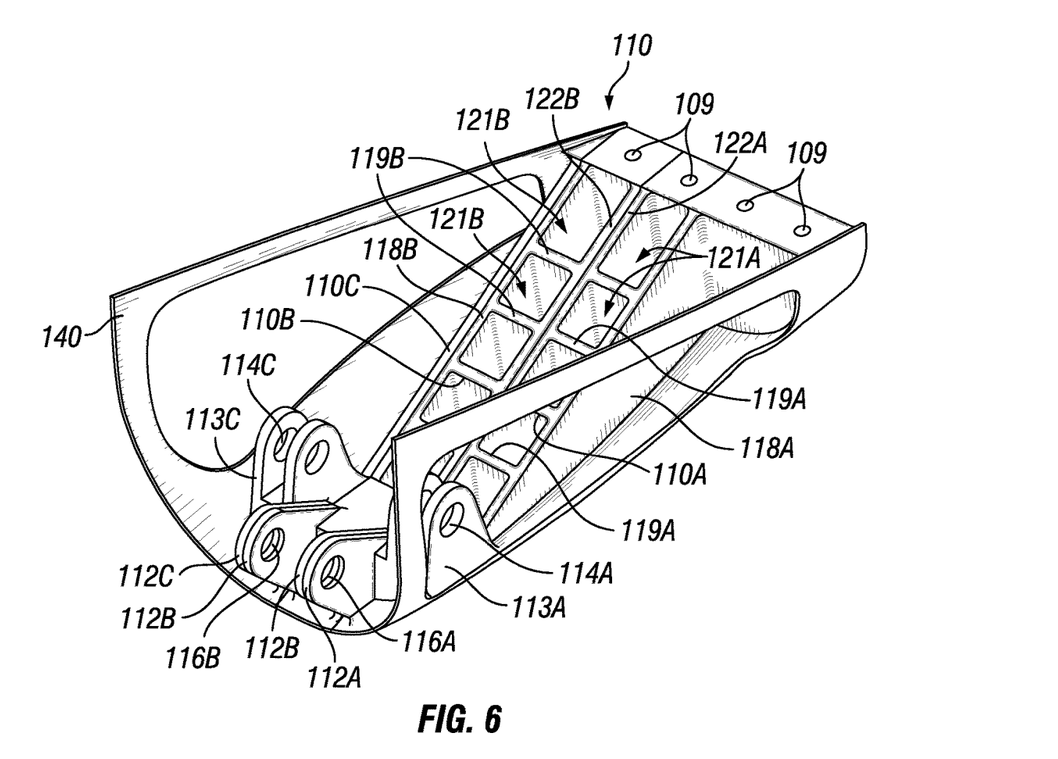
FIG. 6 is a schematic of one example of a support beam of collapsible flap deployment system for a wing of an aircraft.

FIG. 6 is a schematic of one example of a support beam 110 of collapsible flap deployment system 300 for a wing of an aircraft. The support beam 110 comprises a first support beam 110A, a second support beam 110B, and a third support beam 110C. A fairing 140 covers at least a portion of the support beam 110 as discussed herein. Portions of the fairing 140 have been removed for clarity purposes in FIG. 6. The first support beam 110A includes a plurality of pockets 121A formed between a first sidewall 118A, a second sidewall 122A, and a plurality of cross members 119A. Likewise, the second support beam 110B includes a plurality of pockets 121B formed between a first sidewall 118B, a second sidewall 122B, and a plurality of cross members 119B. The utilization of pockets 121A, 121B and cross members 119A, 119B may permit the first and second support beams 110A, 110B to have sufficient structural strength while minimizing the weight of the first and second support beams 110A, 110B. The first and second support beams 110A, 110B include a plurality of apertures 109 that enable the insertion of fasteners to connect the first and second support beams 110A, 110B to the first and second rear spar fittings 150A, 150B, respectively, as discussed herein.

FIGS. 7A-7D are schematics showing one example of a collapsible flap deployment system 300 collapsing upon an impact load being applied to a bottom portion of the collapsible flap deployment system 300.

Figure 7A:
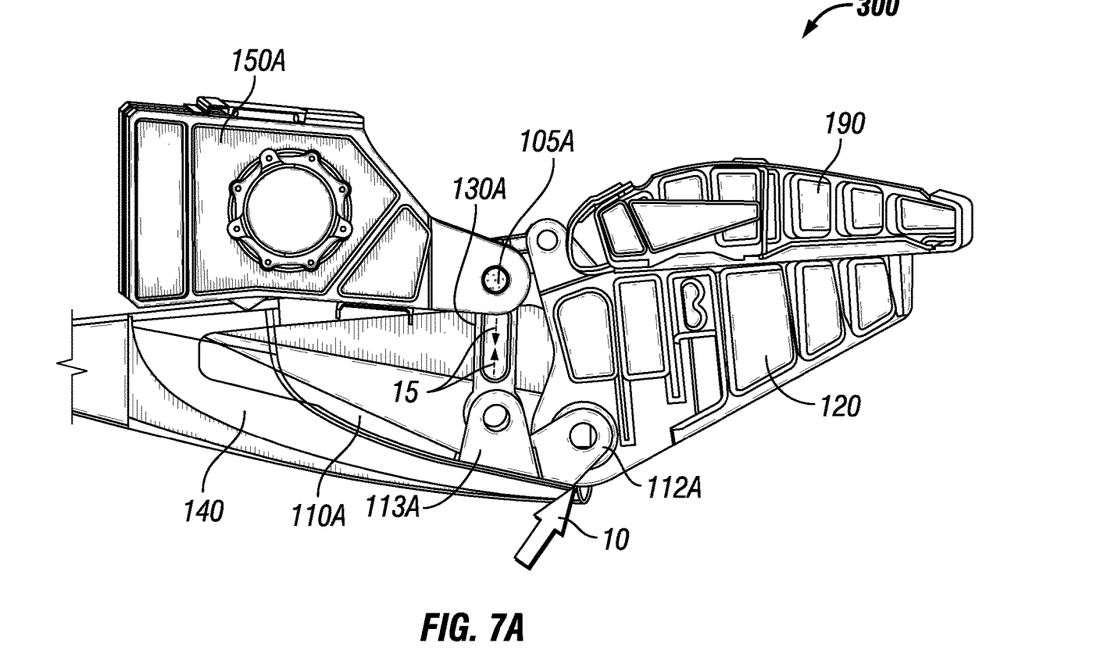
FIGS. 7A-7D are schematics showing the collapsing of one example of a collapsible flap deployment system upon an impact load being applied to a bottom portion of the collapsible flap deployment system.

FIG. 7A shows an impact load 10 being applied to a bottom portion of the collapsible flap deployment system 300. The application of the impact load 10 causes the first link 130A as well as the second link 130B (not shown in FIG. 7A) to be in compression as shown by arrows 15. The first link 130A applies a force to the first fuse pin 105A connecting the first link 130A to the first rear spar fitting 150A. Likewise, the second link 130B applies a force to the second fuse pin 105B connecting the second link 130B to the second rear spar fitting 150B. Once the force being applied to the first and second fuse pins 105A, 105B reaches a first predetermined force, the first and second fuse pins 105A, 105B will shear releasing the first and second links 130A, 130B from the first and second rear spar fittings 150A, 150B, respectively.

Figure 7B:
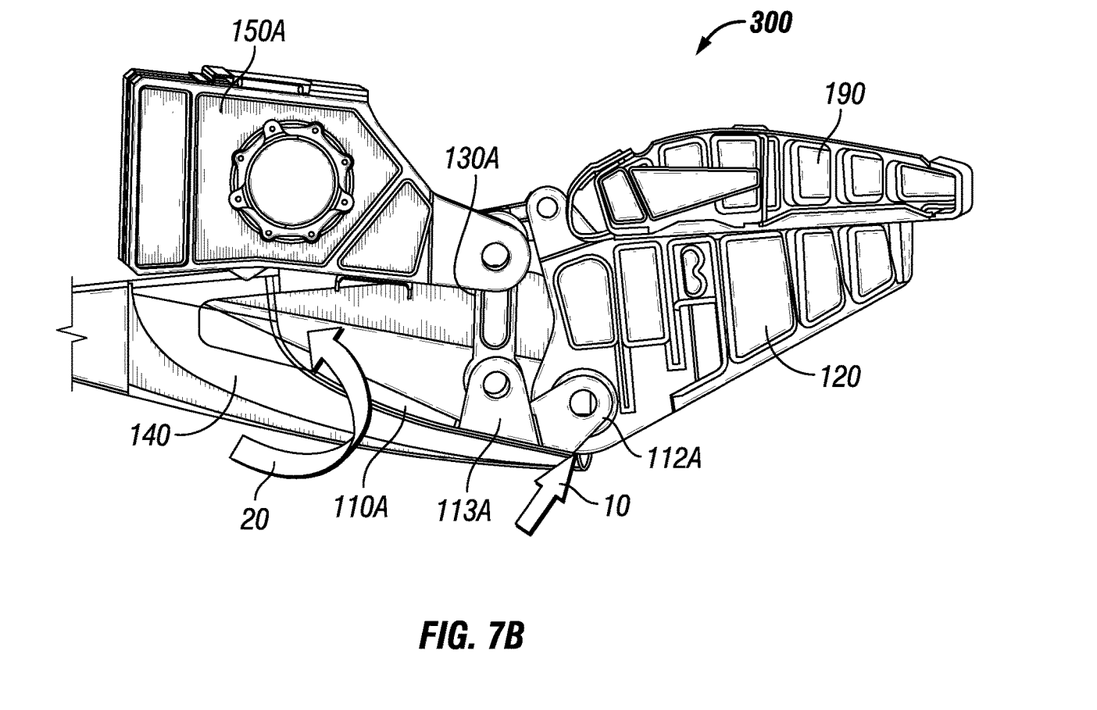

FIG. 7B shows the collapsible flap deployment system 300 after the first and second fuse pins 105A, 105B have been sheared by the first predetermined force. The impact load 10 applied to the bottom portion of the collapsible flap deployment system 300 will cause the collapsible flap deployment system 300 to rotate, as indicated by arrow 20, about the second and fourth plurality of fasteners 115 (shown in FIG. 1), which connect the first ends 111A, 111B of the first and second support beams 110A, 110B to the first and second rear spar fittings 150A, 150B, respectively. The rotations of the collapsible flap deployment system 300 will place a bending force, indicated by arrows 30A and 30B, on the first and second plurality of fasteners 115 as shown in FIG. 8.

Figure 8:
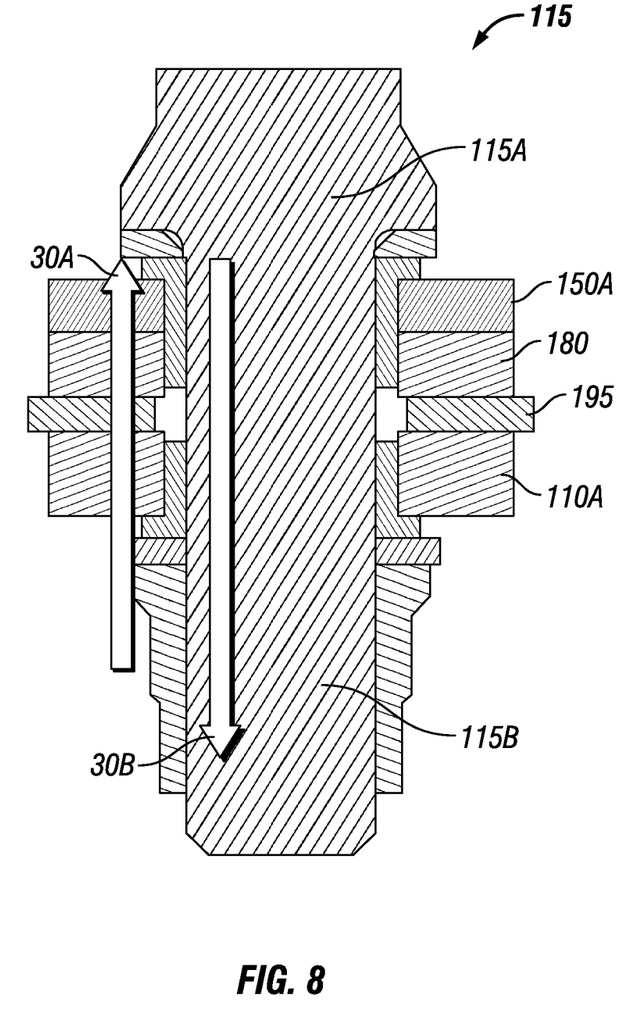
FIG. 8 is a schematic showing a bending force being applied to one example of a fastener of a collapsible flap deployment system.

FIG. 8 shows the fastener 115 includes a head 115A and a shaft 115B. The fasteners 115 connect the first support beam 110A to the first rear spar fitting 150A. A wing skin 180 of the aircraft and a shim 195 are positioned between the first rear spar fitting 150A and the first support beam 110A. Likewise, similar fasteners 115 connect the second support beam 110B to the second rear spar fitting 150B with the wing skin and shim positioned in between as would be appreciated by one of ordinary skill in the art. The fasteners 115 are configured to fail upon the application of the bending force 30A, 30B after the shearing of the first and second fuse pins 105A, 105B. The fasteners 115 are also configured to fail before the failure of the first plurality of fasteners 165A, which connect the first rear spar fitting 150A to the wing rear spar 160. Likewise, the fasteners 115 are also configured to fail before the failure of the third plurality of fasteners 165B, which connect the second rear spar fitting 150B to the wing rear spar 160.

Figure 7C:
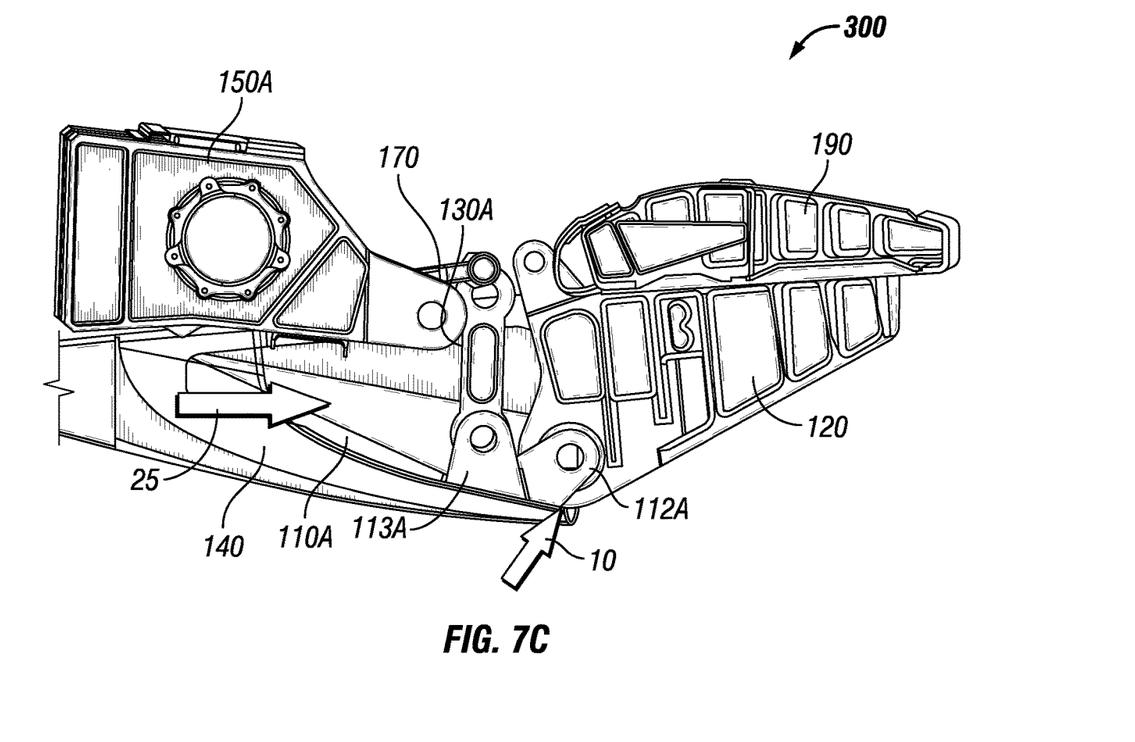
Figure 7D:
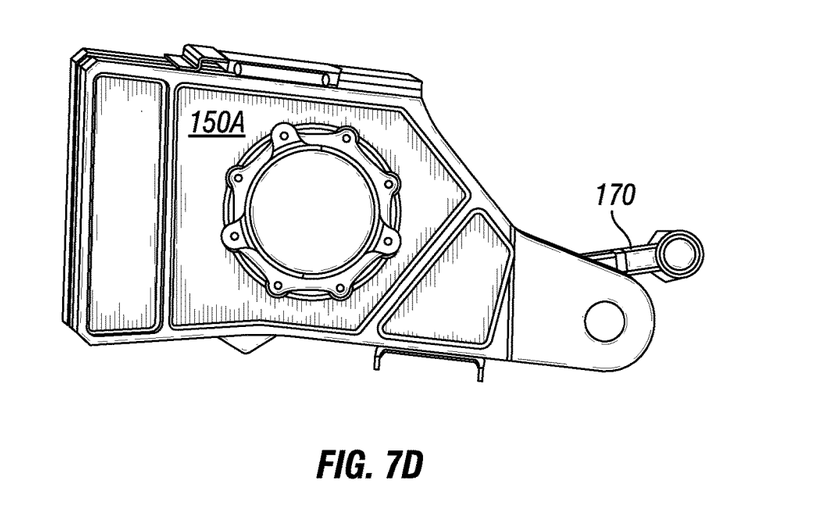

FIG. 7C shows the collapsible flap deployment system 300 after failure of the fasteners 115 connecting the first and second support beams 110A, 110B to the first and second rear spar fittings 150A, 150B, respectively. The failure of the fasteners 115 releases the flap 190, carrier beam 120, and the first and second support beams 110A, 110B from the first and second rear spar fittings 150A, 150B permitting the movement, indicated by arrow 25, away from the first and second rear spar fittings 150A, 150B. The collapsing of the collapsible flap deployment system 300 is configured to move away from the wing rear spar 160 increasing the probability that the fuel tank 161 within the wing rear spar 160 remain intact upon an impact load applied to the collapsible flap deployment system 300. FIG. 7D shows the first and second rear spar fittings 150A, 150B remaining connected to the wing rear spar 160 (shown in FIG. 1) after the flap 190, carrier beam 120, and the first and second support beams 110A, 110B have been selectively released.

Figure 9:
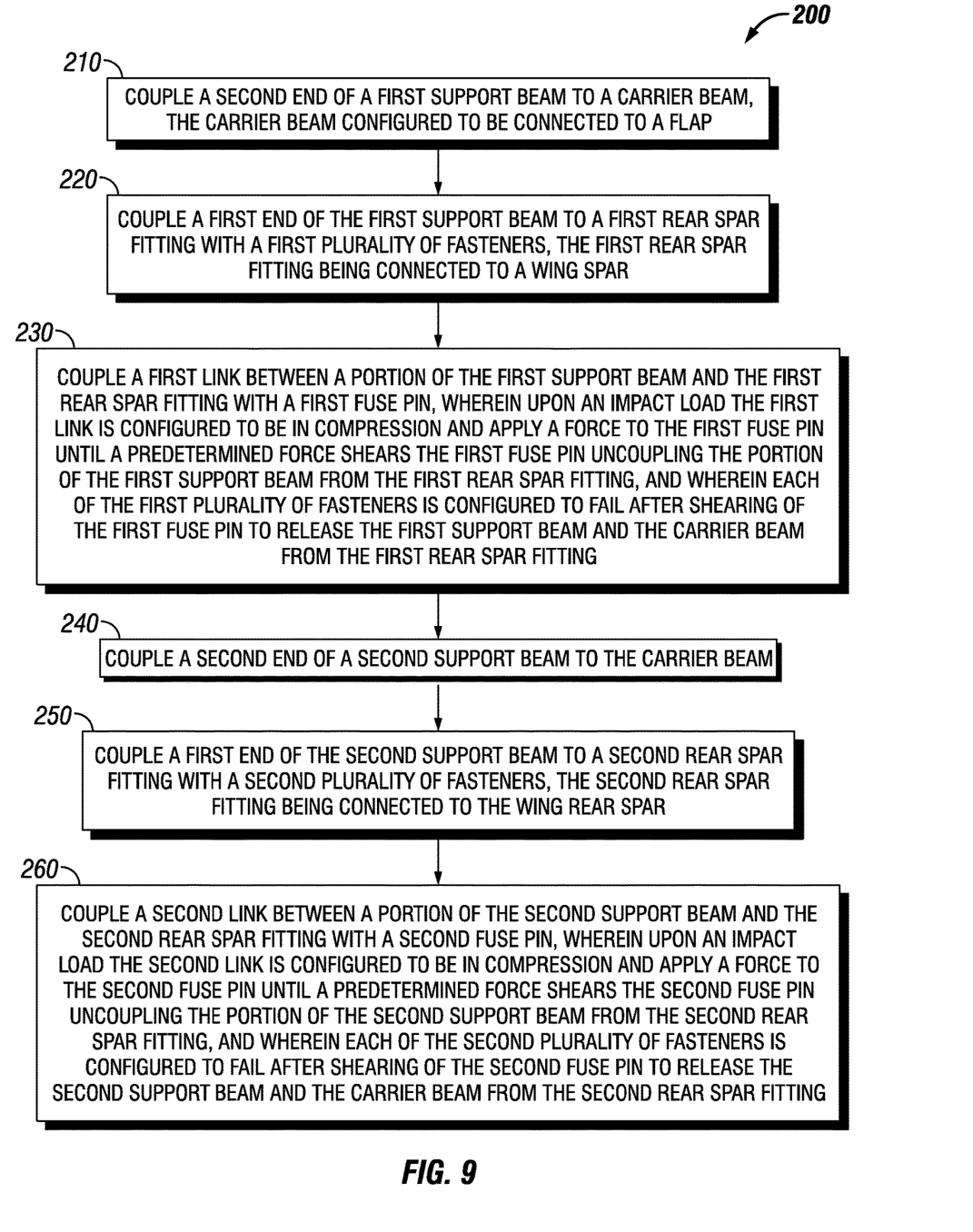
FIG. 9 is a flow chart of one example of a method of providing a collapsible flap deployment apparatus.

FIG. 9 is a flow chart of one example of a method 200 of providing a collapsible flap deployment apparatus. The method 200 comprises coupling a second end of a first support beam to a carrier beam, the carrier beam being configured to be connected to a flap of an aircraft, at 210. At 220, the method 200 includes coupling a first end of the first support beam to a first rear spar fitting with a first plurality of fasteners, the first rear spar being connected to a wing spar. The method 200 includes coupling a first link between a portion of the first support beam and the first rear spar fitting with a first fuse pin, wherein upon an impact load the first link is configured to be in compression and apply a force to the first fuse pin until a predetermined force shears the first fuse pin uncoupling the portion of the first support beam from the first rear spar fitting, at 230. Each of the first plurality of fasteners is configured to fail after shearing of the first fuse pin to release the first support beam and the carrier beam from the first rear spar fitting.

The method 200 may include coupling a second end of a second support beam to the carrier beam, at 240. At 250, the method 200 may include coupling a first end of the second support beam to a second rear spar fitting with a second plurality of fasteners, the second rear spar being connected to the wing spar. The method 200 may include coupling a second link between a portion of the second support beam and the second rear spar fitting with a second fuse pin, wherein upon an impact load the second link is configured to be in compression and apply a force to the second fuse pin until a predetermined force shears the second fuse pin uncoupling the portion of the second support beam from the second rear spar fitting, at 260. Each of the second plurality of fasteners is configured to fail after shearing of the second fuse pin to release the second support beam and the carrier beam from the second rear spar fitting.

Although this disclosure has been described in terms of examples, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A collapsible flap deployment system for a wing of an aircraft comprising:
   a first support beam having a first end and a second end, the first support beam includes a first aperture in a portion of the first support beam;
   a carrier beam pivotably connected to the second end of the first support beam, the carrier beam being configured to connect to a flap;
   a first rear spar fitting connected to a wing rear spar by a first plurality of fasteners;
   a second plurality of fasteners, wherein the second plurality of fasteners connects the first end of the first support beam to the first rear spar fitting;
   a first vertical link having a second aperture, the first vertical link connected between the portion of the first support beam and the first rear spar fitting, wherein the first aperture and the second aperture are aligned; and
   a first fuse pin, wherein the first fuse pin connects the first vertical link to the first rear spar fitting, and wherein the first fuse pin is configured to shear upon an application of a first predetermined force.

2. The collapsible flap deployment system of claim 1, comprising a fuel tank positioned within the wing rear spar.

3. The collapsible flap deployment system of claim 2, wherein each of the second plurality of fasteners is configured to fail upon an application of a second predetermined bending force.

4. The collapsible flap deployment system of claim 3, wherein each of the second plurality of fasteners is positioned outside of the fuel tank.

5. The collapsible flap deployment system of claim 4, wherein upon an impact load being applied to a bottom of the first support beam, the first vertical link is configured to be put in compression until the first fuse pin shears upon application of the first predetermined force to release the first vertical link from the first rear spar fitting.

6. The collapsible flap deployment system of claim 5, wherein upon shearing of the first fuse pin, the first support beam and the carrier beam are configured to rotate away from the second plurality of fasteners.

7. The collapsible flap deployment system of claim 6, wherein the rotation of the first support beam and the carrier beam applies a bending force on the second plurality of fasteners until the application of the second predetermined bending force causes the second plurality of fasteners to fail and release the first end of the first support beam from the first rear spar fitting.

8. The collapsible flap deployment system of claim 7, wherein each of the second plurality of fasteners is configured to fail prior to the first plurality of fasteners.

9. The collapsible flap deployment system of claim 1, wherein the first support beam comprises a first sidewall, a second sidewall, a plurality of cross members that extend between the first sidewall and the second sidewall, and a plurality of pockets between the plurality of cross members and the first and second sidewalls.

10. The collapsible flap deployment system of claim 1, comprising a drive link pivotably connected between the first rear spar fitting and the carrier beam, wherein movement of the drive link moves the flap between a stowed position and a deployed position.

11. The collapsible flap deployment system of claim 1, comprising a fairing that encloses at least a portion of the first support beam.

12. The collapsible flap deployment system of claim 8 comprising:
    a second support beam having a first end and a second end, wherein the carrier beam is pivotably connected to the second end of the second support beam;
    a second rear spar fitting connected to the wing rear spar by a third plurality of fasteners;
    a fourth plurality of fasteners, wherein the fourth plurality of fasteners connects the first end of the second support beam to the second rear spar fitting;
    a second vertical link connected between a portion of the second support beam and the second rear spar fitting; and
    a second fuse pin, wherein the second fuse pin connects the second vertical link to the second rear spar fitting, and wherein the second fuse pin is configured to shear upon the application of the first predetermined force.

13. The collapsible flap deployment system of claim 12, wherein upon the impact load being applied to a bottom of the second support beam, the second vertical link is configured to be put in compression until the second fuse pin shears upon application of the first predetermined force to release the second vertical link from the second rear spar fitting.

14. The collapsible flap deployment system of claim 13, wherein each of the fourth plurality of fasteners is positioned outside of the fuel tank.

15. The collapsible flap deployment system of claim 14, wherein each of the fourth plurality of fasteners is configured to fail prior to the third plurality of fasteners.

16. A collapsible flap deployment apparatus comprising:
    a first support beam having a first end and a second end, the first support beam includes a first aperture in a portion of the first support beam;
    a carrier beam pivotably connected to the second end of the first support beam, the carrier beam being configured to connect to a flap;
    a first rear spar fitting connected to a wing rear spar by a first plurality of fasteners;
    a second plurality of fasteners, wherein the second plurality of fasteners connects the first end of the first support beam to the first rear spar fitting;
    a first vertical link having a second aperture, the first vertical link connected between the portion of the first support beam and the first rear spar fitting, wherein the first aperture and the second aperture are aligned;
    a first fuse pin, wherein the first fuse pin connects the first vertical link to the first rear spar fitting, and wherein the first fuse pin is configured to shear upon an application of a first predetermined force;
    a second support beam having a first end and a second end, wherein the carrier beam is pivotably connected to the second end of the second support beam;
    a second rear spar fitting connected to the wing rear spar by a third plurality of fasteners;
    a fourth plurality of fasteners, wherein the fourth plurality of fasteners connects the first end of the second support beam to the second rear spar fitting;
    a second vertical link connected between a portion of the second support beam and the second rear spar fitting; and
    a second fuse pin, wherein the second fuse pin connects the second vertical link to the second rear spar fitting, and wherein the second fuse pin is configured to shear upon the application of the first predetermined force.

17. The collapsible flap deployment apparatus of claim 16, wherein upon an impact load being applied to a bottom of the first and second support beams, the first vertical link, the second vertical link, the first plurality of fasteners, the second plurality of fasteners, the third plurality of fasteners, and the fourth plurality of fasteners are configured to first release the second ends of the first and second support beams from the first and second rear spar fittings, respectively, by the shearing of the first and second fuse pins.

18. The collapsible flap deployment apparatus of claim 17, wherein upon the application of the impact load the first vertical link, the second vertical link, the first plurality of fasteners, the second plurality of fasteners, the third plurality of fasteners, and the fourth plurality of fasteners are configured to release the first ends of the first and second support beams from the first and second rear spar fittings, respectively, after the shearing of the first and second fuse pins by causing the second and fourth plurality of fasteners to fail and release the first support beam, the second support beam, and the carrier beam from the first and second rear spar fittings.

19. A method of providing a collapsible flap deployment apparatus comprising:
    coupling a second end of a first support beam to a carrier beam, the carrier beam configured to be connected to a flap and the first beam includes a first aperture in a portion of the first support beam;
    coupling a first end of the first support beam to a first rear spar fitting with a first plurality of fasteners, the first rear spar fitting being connected to a wing rear spar; and
    coupling a first vertical link between the portion of the first support beam and the first rear spar fitting with a first fuse pin, wherein the first aperture and the second aperture are aligned and wherein upon an impact load being applied to the apparatus the first vertical link is configured to be in compression and apply a force to the first fuse pin until a predetermined force shears the first fuse pin uncoupling the portion of the first support beam from the first rear spar fitting, and wherein each of the first plurality of fasteners is configured to fail after the shearing of the first fuse pin to release the first support beam and the carrier beam from the first rear spar fitting.

20. The method of providing a collapsible flap deployment apparatus of claim 19, comprising:
    coupling a second end of a second support beam to the carrier beam;
    coupling a first end of the second support beam to a second rear spar fitting with a second plurality of fasteners, the second rear spar fitting being connected to the wing rear spar; and
    coupling a second vertical link between a portion of the second support beam and the second rear spar fitting with a second fuse pin, wherein upon the impact load the second vertical link is configured to be in compression and apply a force to the second fuse pin until a predetermined force shears the second fuse pin uncoupling the portion of the second support beam from the second rear spar fitting, and wherein each of the second plurality of fasteners is configured to fail after the shearing of the second fuse pin to release the second support beam and the carrier beam from the second rear spar fitting.

\* \* \* \* \*